United States Patent
Ying et al.

(10) Patent No.: US 10,175,539 B2
(45) Date of Patent: Jan. 8, 2019

(54) METHOD OF PERFORMING PHOTO ALIGNMENT TO LIQUID CRYSTAL PANEL AND MASK

(71) Applicant: Shenzhen China Star Optoelectronics Technology Co., Ltd., Shenzhen, Guangdong (CN)

(72) Inventors: Jianjian Ying, Guangdong (CN); Peng Du, Guangdong (CN); Wen Dai, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 130 days.

(21) Appl. No.: 15/123,665

(22) PCT Filed: Jul. 11, 2016

(86) PCT No.: PCT/CN2016/089598
§ 371 (c)(1),
(2) Date: Sep. 5, 2016

(87) PCT Pub. No.: WO2017/210947
PCT Pub. Date: Dec. 14, 2017

(65) Prior Publication Data
US 2018/0196316 A1  Jul. 12, 2018

(30) Foreign Application Priority Data
Jun. 7, 2016  (CN) .......................... 2016 1 0404535

(51) Int. Cl.
*G02F 1/1337*  (2006.01)

(52) U.S. Cl.
CPC ...... *G02F 1/133788* (2013.01); *G02F 1/1337* (2013.01)

(58) Field of Classification Search
CPC ..................... G02F 1/133788; G02F 1/1337
See application file for complete search history.

(56) References Cited

U.S. PATENT DOCUMENTS

2007/0017895 A1  1/2007  Yotsuya
2011/0085097 A1  4/2011  Lee et al.
(Continued)

FOREIGN PATENT DOCUMENTS

| CN | 104965388 A | 10/2015 |
|---|---|---|
| CN | 105068329 A | 11/2015 |
| TW | 201007351 A | 2/2010 |

*Primary Examiner* — James Dudek
(74) *Attorney, Agent, or Firm* — Andrew C. Cheng

(57) ABSTRACT

The present application discloses a method of performing photo alignment to a liquid crystal panel and a mask, the method including: disposing a mask in one side of a liquid crystal panel, the mask including at least two regions, the two regions makes incident lights passed and generating emission lights with different polarization directions respectively; making the incident light passed through the mask, to generate the emission lights with different polarization direction, and perform a photo alignment to the different regions of the liquid crystal panel. By the approach above, the process of the photo alignment is changed in the present application, thereby reducing the time of the photo alignment process and increase productivity.

6 Claims, 6 Drawing Sheets

(56) References Cited

U.S. PATENT DOCUMENTS

| | | | |
|---|---|---|---|
| 2011/0217638 A1* | 9/2011 | Kim | G02B 5/3083 |
| | | | 430/20 |
| 2012/0064441 A1 | 3/2012 | Tanaka | |
| 2013/0100431 A1* | 4/2013 | Kajiyama | G03F 9/7084 |
| | | | 355/72 |
| 2014/0313464 A1 | 10/2014 | Li et al. | |
| 2015/0227057 A1* | 8/2015 | Umezawa | G02F 1/133788 |
| | | | 359/486.02 |
| 2015/0253631 A1* | 9/2015 | Hatanaka | G02B 5/201 |
| | | | 428/195.1 |
| 2016/0238927 A1 | 8/2016 | Liu et al. | |
| 2017/0115495 A1 | 4/2017 | Bai | |

* cited by examiner

METHOD OF PERFORMING PHOTO ALIGNMENT TO LIQUID CRYSTAL PANEL AND MASK

FIELD OF THE INVENTION

The present application relates to a display technology field, and more particularly to a method of performing photo alignment to a liquid crystal panel and a mask.

BACKGROUND OF THE INVENTION

The high-generation glass substrates, in order to raise the utilization rate of the glass, reduce costs, the technology of Multi Mode Glass, MMG is adapted, that is arranged different sizes of panel on a glass substrate, in this way, the area of the substrate to be discarded is smaller, the cutting efficiency of the glass substrate is high, thereby used by the liquid crystal panel makers.

Typically, the arrangement of the panel in different sizes on the large glass substrate is in different ways, therefore the required polarization direction of the polarized light is different, when processing the photo alignment. In the conventional photo alignment process, mask is needed in the photo alignment process of the Multi Mode Glass. The photo alignment process is performed to the panel with one size, and the mask is used to block the other panel with other arrangement. Hence the multiple photo alignment process is needed, this will result in increased process time, reduces the productivity.

SUMMARY OF THE INVENTION

The main technology problem to be solved in the present application is to provide a method of performing photo alignment to a liquid crystal panel and a mask to improve the process of the photo alignment, thereby reducing the time of the photo alignment process and increase productivity.

In order to solve the technology problem above, a technology approach adapted in the present application is: providing a method of performing photo alignment to a liquid crystal panel, including: disposing a mask in one side of a liquid crystal panel, the mask including at least two regions, the two regions makes incident lights passed and generating emission lights with different polarization directions respectively; making the incident light passed through the mask, to generate the emission lights with different polarization direction, and perform a photo alignment to the different regions of the liquid crystal panel; wherein the step of making the incident light passed through the mask, to generate the emission lights with different polarization direction, and perform a photo alignment to the different regions of the liquid crystal panel, including: making the incident light passed through the mask, to generate the emission lights with the polarization direction perpendicular to each other and perform the photo alignment to the different regions of the liquid crystal panel; and wherein the mask including a wave material and a light absorbing material parallel arranged, or the mask including at least two wave materials disposed in interval.

Wherein the wave material is a half wave plate, the angle between the optical axis of the half wave plate and a side of the mask is $\pi/4$, partial of the incident light transmitted the light absorbing material without changing the direction of the incident light.

Wherein the mask including two types of half wave plate, the angle between the optical axis of the first type of the half wave plate and a side of the mask is $\pi/8$, the angle between the optical axis of the second type of the half wave plate and a side of the mask is $3\pi/8$ or the angle between the optical axis of the first type of the half wave plate and the optical axis of the second type of the half wave plate is $\pi/4$, wherein the polarization direction of the incident light is located in middle of the optical axis of the first type of the half wave plate and the optical axis of the second type of the half wave plate.

In order to solve the technology problem above, the other technology approach adapted in the present application is: providing a method of performing photo alignment to a liquid crystal panel, including: disposing a mask in one side of a liquid crystal panel, the mask including at least two regions, the two regions makes incident lights passed and generating emission lights with different polarization directions respectively; making the incident light passed through the mask, to generate the emission lights with different polarization direction, and perform a photo alignment to the different regions of the liquid crystal panel.

Wherein the step of making the incident light passed through the mask, to generate the emission lights with different polarization direction, and perform a photo alignment to the different regions of the liquid crystal panel, including: making the incident light passed through the mask, to generate the emission lights with the polarization direction perpendicular to each other and perform the photo alignment to the different regions of the liquid crystal panel.

Wherein the mask including a wave material and a light absorbing material parallel arranged, or the mask including at least two wave materials disposed in interval.

Wherein the wave material is a half wave plate, the angle between the optical axis of the half wave plate and a side of the mask is $\pi/4$, partial of the incident light transmitted the light absorbing material without changing the direction of the incident light.

Wherein the mask including two types of half wave plate, the angle between the optical axis of the first type of the half wave plate and a side of the mask is $\pi/8$, the angle between the optical axis of the second type of the half wave plate and a side of the mask is $3\pi/8$ or the angle between the optical axis of the first type of the half wave plate and the optical axis of the second type of the half wave plate is $\pi/4$, wherein the polarization direction of the incident light is located in middle of the optical axis of the first type of the half wave plate and the optical axis of the second type of the half wave plate.

In order to solve the technology problem above, the other technology approach adapted in the present application is providing a mask to perform photo alignment process to a liquid crystal panel, wherein the mask including at least two regions, the two regions makes incident lights passed and generating emission lights with different polarization directions respectively.

Wherein the mask makes the incident light passed and generated the emission lights with the polarization direction perpendicular to each other respectively.

Wherein the mask including a wave material and a light absorbing material parallel arranged, or the mask including at least two wave materials disposed in interval.

Wherein the wave material is a half wave plate, the angle between the optical axis of the half wave plate and a side of the mask is $\pi/4$, partial of the incident light transmitted the light absorbing material without changing the direction of the incident light.

Wherein the mask including two types of half wave plate, the angle between the optical axis of the first type of the half wave plate and a side of the mask is π/8, the angle between the optical axis of the second type of the half wave plate and a side of the mask is 3π/8 or the angle between the optical axis of the first type of the half wave plate and the optical axis of the second type of the half wave plate is π/4, wherein the polarization direction of the incident light is located in middle of the optical axis of the first type of the half wave plate and the optical axis of the second type of the half wave plate.

The advantage of the present application is: compared to the conventional technology, the mask of the present application is disposed in a side of the liquid crystal panel, the mask including at least two regions, the two regions makes incident lights passed and generating emission lights with different polarization directions respectively; making the incident light passed through the mask, to generate the emission lights with different polarization direction, and perform a photo alignment to the different regions of the liquid crystal panel. Since the mask includes at least two regions, the incident lights passed through the two regions of the mask can generate emission lights with different polarization direction respectively. By the approach, the process of the photo alignment is changed, thereby reducing the time of the photo alignment process and increase productivity.

BRIEF DESCRIPTION OF THE DRAWINGS

In order to more clearly illustrate the embodiments of the present application or prior art, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts obtained should be considered within the scope of protection of the present application.

Specifically, the terminologies in the embodiments of the present application are merely for describing the purpose of the certain embodiment, but not to limit the invention. Examples and the claims be implemented in the present application requires the use of the singular form of the book "an", "the" and "the" are intend to include most forms unless the context clearly dictates otherwise. It should also be understood that the terminology used herein that "and/or" means and includes any or all possible combinations of one or more of the associated listed items.

Figure 1:
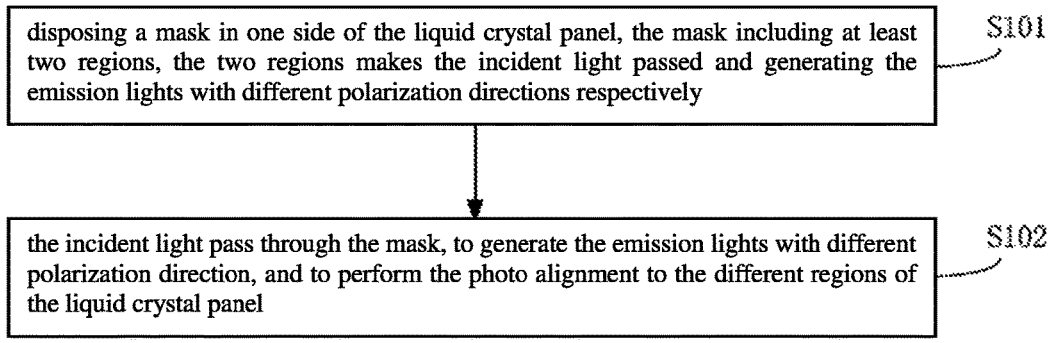
FIG. 1 illustrates a schematic flow of the method of performing photo alignment to a liquid crystal panel in the embodiment of the present application.

Referring to FIG. 1, FIG. 1 illustrates a schematic flow of the method of performing photo alignment to the liquid crystal panel in the embodiment of the present application, includes:

Step S101: disposing a mask in one side of the liquid crystal panel, the mask including at least two regions, the two regions makes the incident light passed and generating the emission lights with different polarization directions respectively.

Step S102: the incident light pass through the mask, to generate the emission lights with different polarization direction, and to perform the photo alignment to the different regions of the liquid crystal panel.

Figure 2:
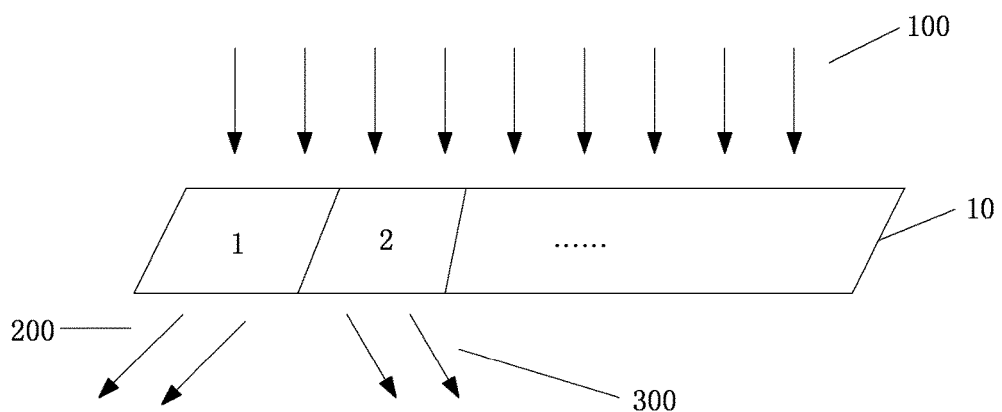
FIG. 2 illustrates a schematic structure of a mask of the method of performing photo alignment to the liquid crystal panel of the present application.

Referring to FIG. 2, the mask 10 includes at least two regions 1, 2, . . . , the two regions 1,2 makes the incident light 100 passes thought the mask to generate the emission lights 200, 300 with different polarization direction.

Figure 3:
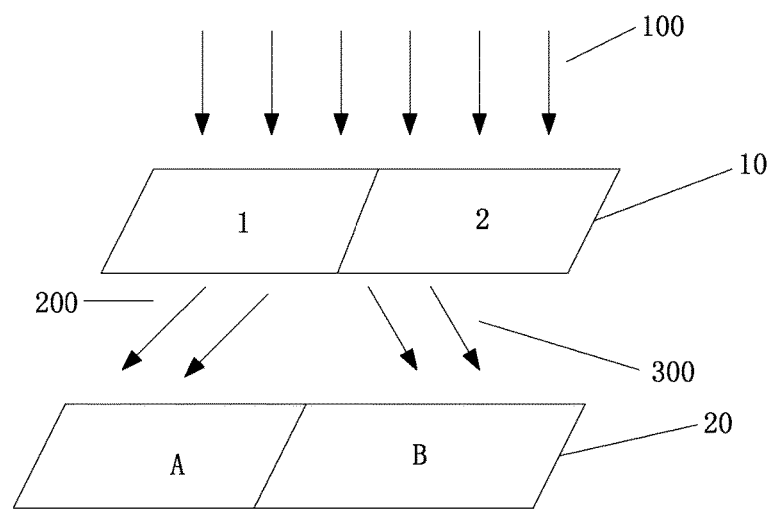
FIG. 3 illustrates a schematic structure of using the mask to perform photo alignment to the liquid crystal panel of the method of performing photo alignment to the liquid crystal panel in the embodiment of the present application.

As illustrated in FIG. 3, when the mask 10 is placed on one side of the liquid crystal panel 20, the incident light 100 pass through the mask 10, to generate the emission lights 200, 300 with different polarization direction and to perform the photo alignment to the different regions A, B of the liquid crystal panel 20.

When the different regions of the liquid crystal panel, the polarization direction of the polarized light required by the photo alignment is different, in the conventional technology, usually using different mask, the polarized light corresponding to different polarization direction is adapted respectively to repeated exposure different regions of the liquid crystal panel, so that resulting in the increased process time, and the production efficiency is not high.

The mask of the present application includes at least two regions, the two regions makes the incident light passed and generating the emission lights with different polarization directions respectively, the mask is placed on one side of the liquid crystal panel, when the light pass through the mask to generate the emission lights with different polarization direction and to perform the photo alignment to the different regions of the liquid crystal panel. In this way, the process of the photo alignment is changed fundamentally; the requirement of the photo alignment of the different regions of the glass substrate by one exposure is met, thereby reducing the time of the photo alignment process and increase productivity.

Wherein, the step S102 specifically includes the incident light pass through the mask to generate the emission lights with the polarization direction perpendicular to each other and perform the photo alignment to the different regions of the liquid crystal panel.

In this case, the structure and material of the mask can be corresponded design. In one embodiment, the mask includes a wave material and a light absorbing material parallel arranged, or the mask includes at least two wave materials disposed in interval.

Figure 4:
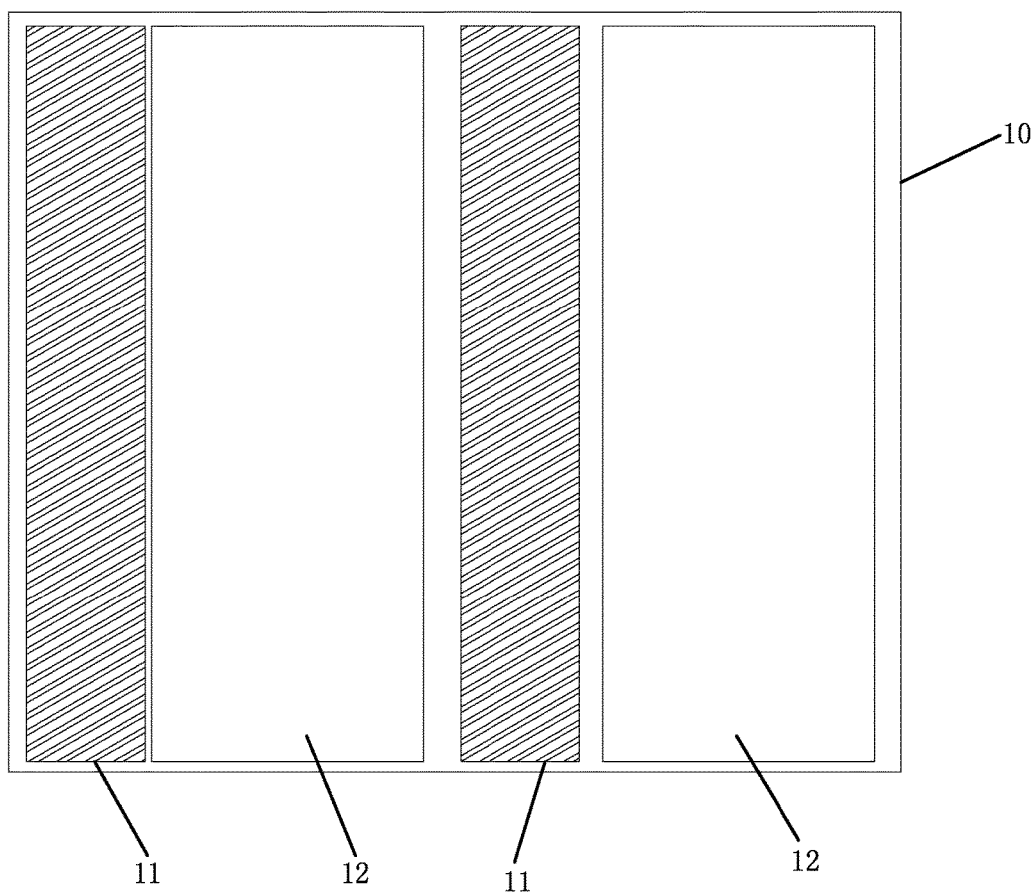
FIG. 4 illustrates a schematic structure of a mask of the method of performing photo alignment to the liquid crystal panel in the embodiment of the present application.

Specifically, as illustrated in FIG. 4, the mask 10 includes as wave material 11 and a light absorbing material 12 parallel arranged, the wave material 11 is a half wave plate, the angle between the optical axis of the half wave plate and a side of the mask is $\pi/4$, partial of the incident light transmitted the light absorbing material 12 without changing the direction of the incident light. It should be noted that, the times to repeatedly arranged the wave material 11 and the light absorbing material 12 in the mask is determined according to the actual situation. (As the FIG. 4 illustrates the wave material 11 and the light absorbing material 12 are arranged and repeated in 2 times)

The half wave plate can change the polarization direction of the light, if the angle between the polarization direction of the incident light and the optical axis of the half wave plate is $\theta$, the polarization direction of the emission light is deflected in $2\theta$. The angle between the optical axis of the half wave plate and a side of the mask (i.e., the horizontal plane of the mask) is $\pi/4$ to make the polarization direction of the incident light is deflected in twice of the angle such as $\pi/2$, partial of the incident light transmitted the light absorbing material 12 without changing the direction of the incident light. Therefore, the polarization direction of the angle between the emission light transmitted from the half wave plate and the emission light transmitted from the light absorbing material is $\pi/2$. Further, by choosing the material, the light absorption level of the light absorbing material is keeping consist to the half wave plate, to ensure the same intensity of light transmitted through the mask.

Figure 5:
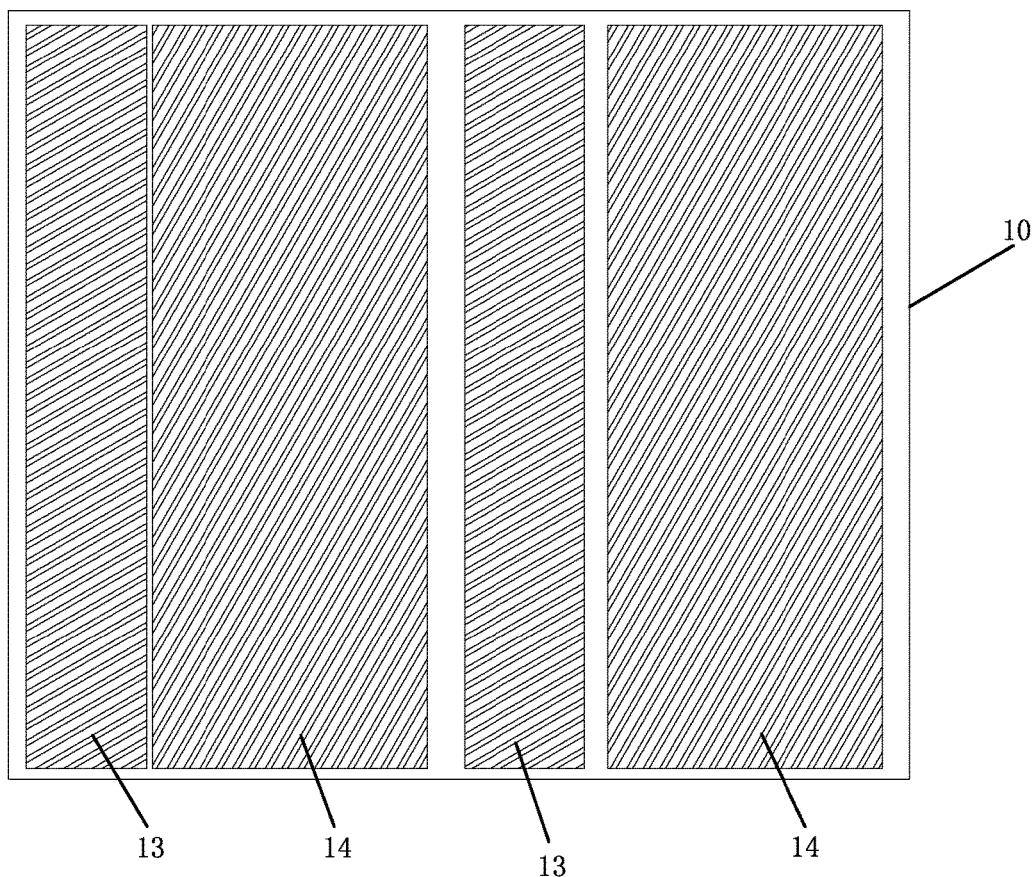
FIG. 5 illustrates a schematic structure of a mask of the method of performing photo alignment to the liquid crystal panel in another embodiment of the present application.

Specifically, as illustrated in FIG. 5, the mask 10 is made of two types of half wave plate 13, 14. The angle between the optical axis of the first type of the half wave plate 13 and a side of the mask 10 is $\pi/8$, the angle between the optical axis of the second type of the half wave plate 14 and a side of the mask 10 is $3\pi/8$.

The angle between the optical axis of the first type of the half wave plate 13 and a side of the mask 10 is $\pi/8$, make the polarization direction of the incident light is deflected toward twice of the angle, such as $\pi/4$. The angle between the optical axis of the second type of the half wave plate 14 and a side of the mask 10 is $3\pi/8$, make the polarization direction of the incident light is deflected toward twice of the angle to a direction, such as $3\pi/4$. Therefore, the polarization direction of the angle between the emission light transmitted from the first type of the half wave plate 13 and the emission light transmitted from the second type of the half wave plate 14 is $(3\pi/4)-(\pi/4)$, that is $\pi/2$.

Alternatively, the angle between the optical axis of the first type of the half wave plate 13 and the optical axis of the second type of the half wave plate 14 is $\pi/4$, wherein the polarization direction of the incident light is located in middle of the optical axis of the first type of the half wave plate and the optical axis of the second type of the half wave plate.

The angle between the optical axis of the first type of the half wave plate 13 and the optical axis of the second type of the half wave plate 14 is $\pi/4$, and the polarization direction of the incident light is located in middle of the optical axis of the first type of the half wave plate and the optical axis of the second type of the half wave plate. In other words, the angle between the polarization direction of the incident light and the optical axis of the first type of the half wave plate 13 is $\pi/8$, to make the polarization direction of the incident light is deflected toward twice of the angle to a direction, such as $\pi/4$. The angle between the polarization direction of the incident light and the optical axis of the second type of the half wave plate 14 is $\pi/8$, to make the polarization direction of the incident light is deflected toward twice of the angle to a direction, such as $\pi/4$. Therefore, the polarization direction of the angle between the emission light transmitted from the first type of the half wave plate 13 and the emission light transmitted from the second type of the half wave plate 14 is $(\pi/4)+(\pi/4)$, that is $\pi/2$.

Below illustrated the method to perform the photo alignment to the liquid crystal panel in practical application of the present application, to specific described the method of the Taking the arrangement of 43 inch and 22 inch In-Plane Switching, IPS mode liquid crystal display panel disposed on the 8.5-generation line (G8.5) glass substrate (2.5 m*2.2 m) as an example to illustrate.

Figure 6:
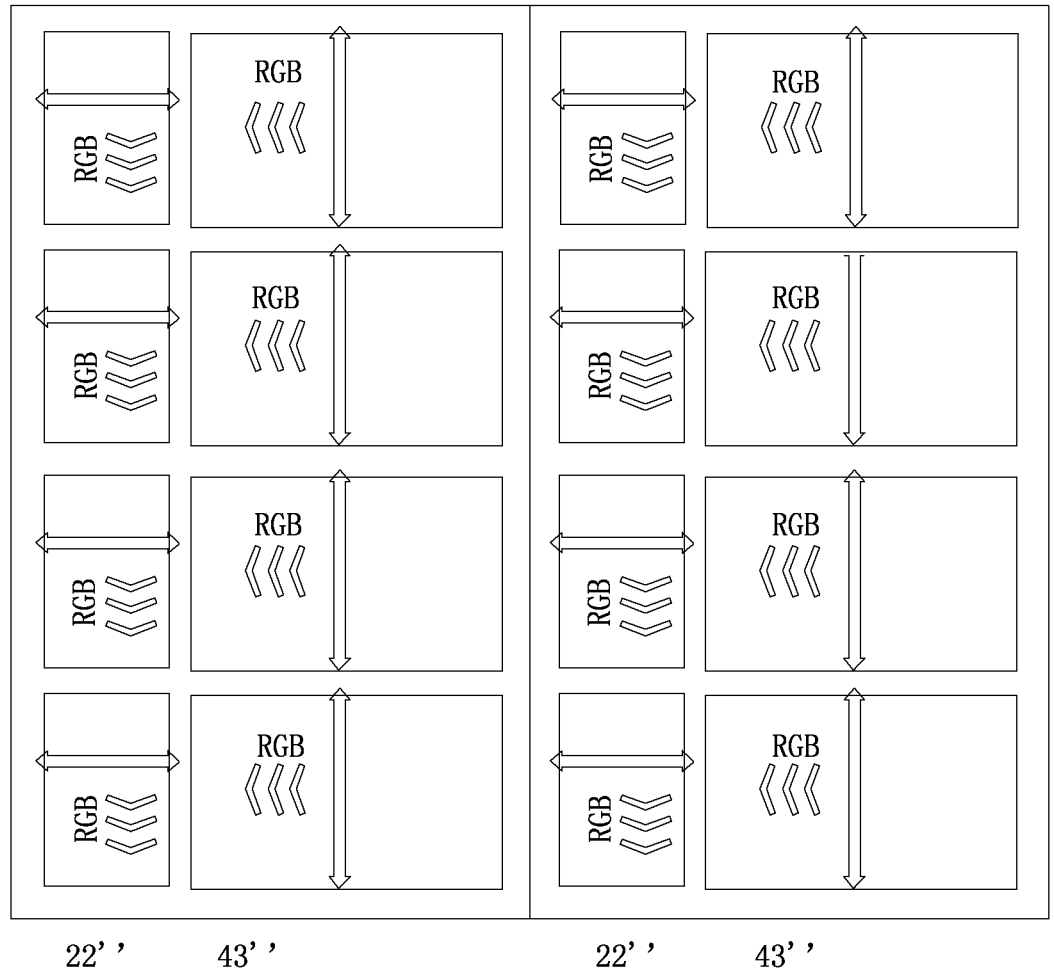
FIG. 6 illustrates a schematic structure of arranging the two sizes of 43 inch and 22 inch panels in a 8.5 generation line glass substrate.
Figure 7:
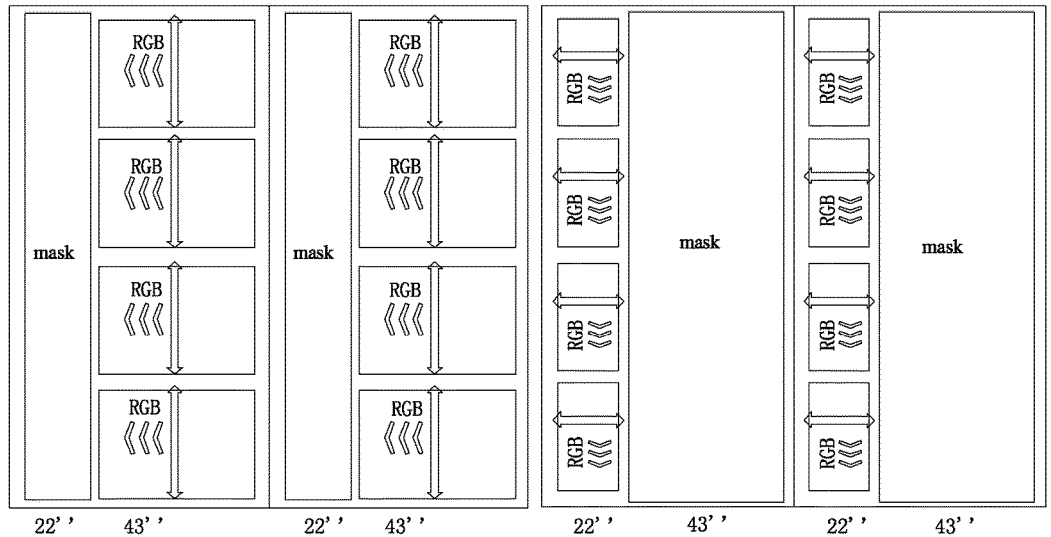
FIG. 7 illustrates a schematic structure of performing photo alignment to the glass substrate in the conventional technology illustrated in FIG. 6.

As illustrated in FIG. 6, the two sizes of the 43 inch and 22 inch In-Plane Switching, IPS mode liquid crystal display panel disposed on the 8.5-generation line (G8.5) large glass substrate. Because of the different panel arrangement manner, resulting in the polarization directions needed to the photo alignment of the two sizes is perpendicular, referring to FIG. 7, in the conventional photo alignment method, it need to perform twice photo alignment process. When preforming the photo alignment to 43 inch panel, it need to cover the 22 inch panel area by the first kind of mask (illustrated in the left of the FIG. 7), after finishing the photo alignment, the 43 inch panel area need to be covered and then perform the photo alignment of the 22 inch panel area (illustrated in the right of the FIG. 7). Therefore, the two photo alignment processes need to be performed to complete the photo alignment of different sizes on a glass substrate. The entire photo alignment process need two times of the time for each photo alignment, resulting in longer production time.

By adaption of the method of the present application, the manufacturing process can be changed, shorten the process time and increase productivity.

For example, by adaption the technical solutions illustrated in FIG. 4, the mask above the 22 inch panel area is composed of a half wave plate, the angle between the optical axis and a side of the mask is $\pi/4$ to change the polarization direction of the incident light. the mask above the 43 inch panel area is formed by a light absorbing material having a certain ability to absorb light, does not change the direction of incident light, and ensure the light absorption level of the light absorbing material is keeping consist to the half wave plate, to ensure the same intensity of light transmitted through the mask.

Figure 8:
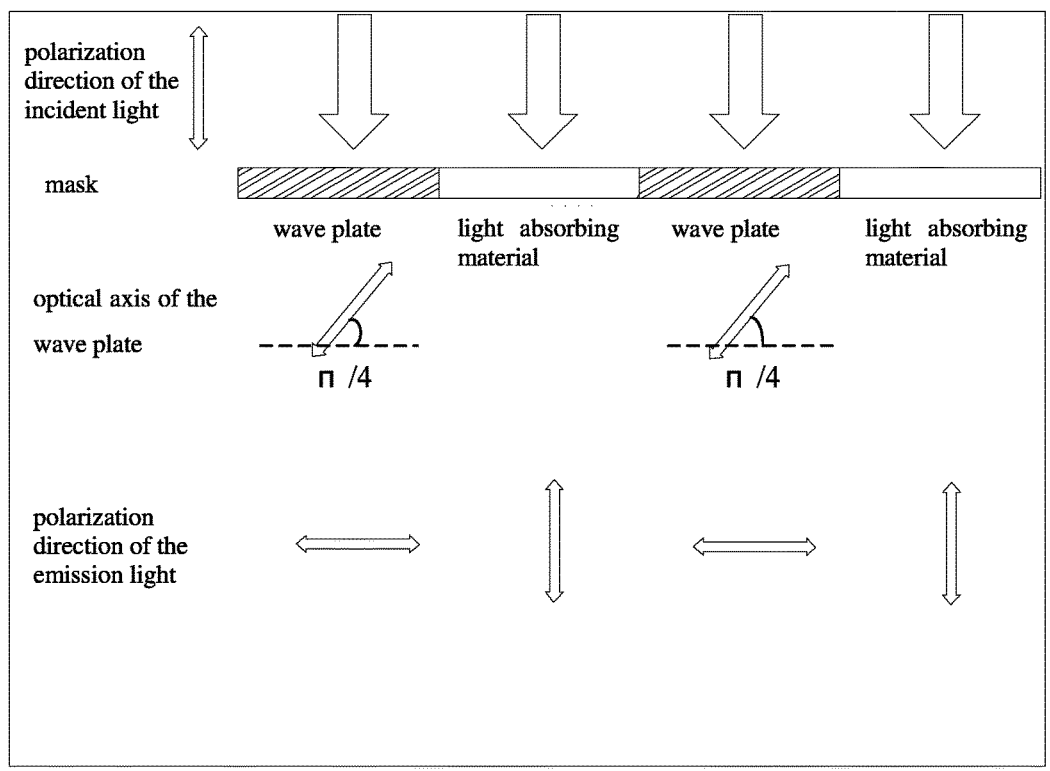
FIG. 8 is a schematic diagram of the basic principle illustrated in FIG. 4.

Referring to FIG. 8, FIG. 8 is a schematic diagram of the basic principle illustrated in FIG. 4, in the present embodiment, the polarization direction of the incident light is set to perpendicular to the vertical direction of the horizontal plane of the mask disposed. The angle between the optical axis of the half wave plate and a side of the mask (or the horizontal plane of the mask disposed) is $\pi/4$, the polarization direction of the emission light passed through the half wave plate deflects $\pi/2$, such as the right and left horizontal direction, and the same with the polarization direction needed of the polarizing light for the photo alignment to 22 inch panel. By the polarization direction of polarizing light of the light absorbing material is unchanged, still is the vertical direction of up and down, and the same with the polarization direction needed of the polarizing light for the photo alignment to 43 inch panel. And by choosing the suitable light absorption material, to ensure the light absorption level of the light absorbing material is keeping consist to the half wave plate, to ensure the same intensity of emission light transmitted from the glass substrate. In this way, by the polarizing light passed through the mask can perform the photo alignment simultaneously with the panels in different arrangement ways, the photo alignment to the panels in different arrangement ways on the entire glass substrate can be complete by performing one photo alignment process to save process time.

Besides, by adaption the technical solutions illustrated in FIG. 5, the whole mask is formed by half wave plate, but the optical axis of the half wave plates above the 43 inch panel and the 22 inch panel are inconsistent. The angle between the optical axis of the half wave plates above the 43 inch panel and a side of the mask (or the horizontal plane of the mask) is $3\pi/8$, the angle between the optical axis of the half wave plates above the 22 inch panel and a side of the mask (or the horizontal plane of the mask) is $\pi/8$, the polarization direction of the emission light passed through the mask is changed.

Figure 9:
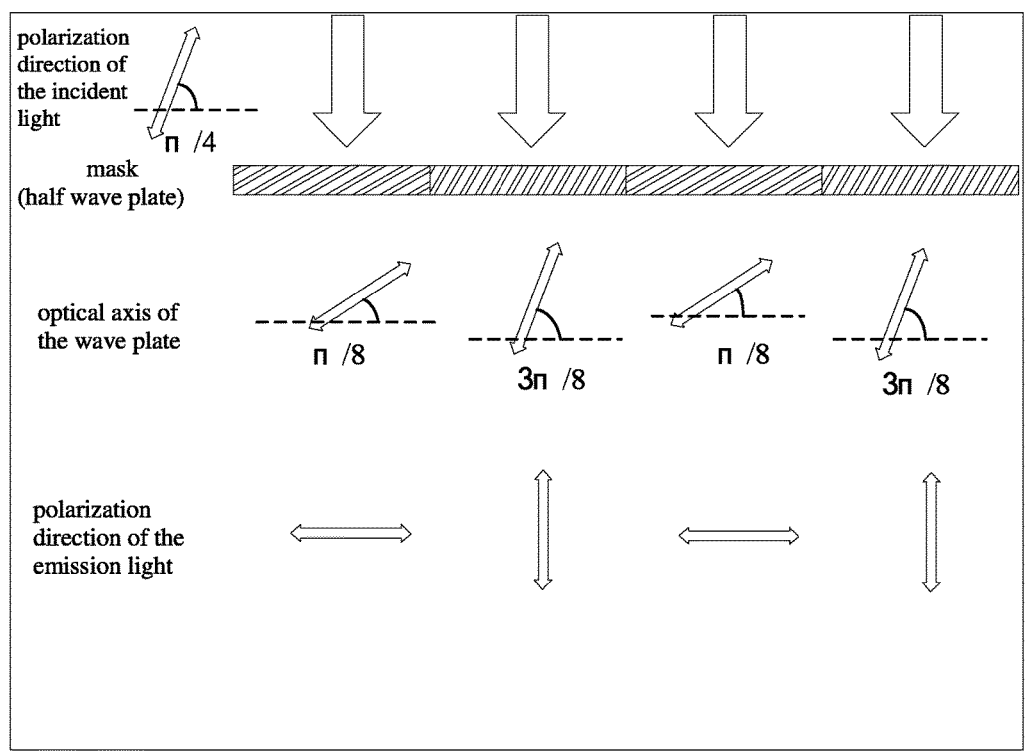
FIG. 9 is a schematic diagram of the basic principle illustrated in FIG. 5.

Referring to FIG. 9, FIG. 9 is a schematic diagram of the basic principle of the present embodiment. In the present embodiment, the horizontal angle between the polarization direction of the incident light and the horizontal plane of the mask disposed is set as $\pi/4$, after the incident light pass the half wave plate (above the 22 inch panel) with the angle between the direction of the optical axis and the horizontal direction of the plane of the mask disposed (such as a side of the mask) is $\pi/8$, the emission light deflects $\pi/4$ in clockwise direction to have a horizontal emission light of the horizontal plane of the mask disposed, wherein the polarization light performs the photo alignment to the 22 inch panel. Similarly, the horizontal angle between the polarization direction of the incident light and the horizontal plane of the mask disposed is set as $\pi/4$, after the incident light pass the half wave plate (above the 43 inch panel) with the angle between the direction of the optical axis and the horizontal direction of the plane of the mask disposed (such as a side of the mask) is $3\pi/8$, the emission light deflects $\pi/4$ in counterclockwise direction to have a perpendicular emission light of the horizontal plane of the mask disposed, wherein the polarization light performs the photo alignment to the 43 inch panel, the same material can ensure the uniformity of the light intensity of the emission light.

The present application also discloses a mask to perform the photo alignment to the liquid crystal panel, the mask including at least two regions, the two regions makes the incident light passed and generating the emission lights with different polarization directions The mask is the mask used in the method described above, for the specific content, please refer to the relevant content in the above method, this is no detail repeat here.

Wherein the mask makes the incident light passed to generate the emission lights with the polarization direction perpendicular to each other, respectively.

Wherein the mask includes a wave material and a light absorbing material parallel arranged, or the mask includes at least two wave materials disposed in interval.

Wherein the wave material is a half wave plate, the angle between the optical axis of the half wave plate and the a side of the mask is $\pi/4$, the light absorbing material transmitted portion of the incident light without changing the direction of incident light.

Wherein the mask is made of two types of half wave plate. The angle between the optical axis of the first type of the half wave plate and a side of the mask is $\pi/8$, the angle between the optical axis of the second type of the half wave plate and a side of the mask is $3\pi/8$, wherein the polarization direction of the incident light is located in middle of the optical axis of the first type of the half wave plate and the optical axis of the second type of the half wave plate.

The mask of the present application includes at least two regions, the two regions makes the incident light passed and generating the emission lights with different polarization directions respectively, the mask is used to perform the photo alignment process. In particular, the mask is disposed on one side of the liquid crystal panel, when the incident light passes through the mask to generate the emission lights with different polarization direction and to perform the photo alignment to the different regions of the liquid crystal panel. In this way, the process of the photo alignment is changed fundamentally; the requirement of the photo alignment of the different regions of the glass substrate by one exposure is met, thereby reducing the time of the photo alignment process and increase productivity.

Above are embodiments of the present application, which does not limit the scope of the present application. Any modifications, equivalent replacements or improvements within the spirit and principles of the embodiment described above should be covered by the protected scope of the invention.

What is claimed is:

1. A method of performing photo alignment to a liquid crystal panel, comprising the following steps:
   disposing a mask on one side of a liquid crystal panel, the mask comprising at least two regions, the two regions being structured to convert incident light passing therethrough into first emission a first and a second polarization directions, respectively;
   making incident light pass through the at least two regions of the mask to generate the first emission light and the second emission light having the first polarization direction and the second polarization directions such that the first emission light and the second emission light having the first and second polarization directions are applied to perform photo alignment to first and second regions of the liquid crystal panel, the first and second regions being different regions of the liquid crystal panel;
   wherein
   the first polarization direction and the second polarization direction are perpendicular to each other
   wherein the mask at least two wave materials that are arranged side by side with respect to each other and a light absorbing material arranged to separate the at least two wave materials from each other so as to form, respectively, the at least two regions of the mask; and
   wherein the mask comprises two types of half wave plate to respectively form the at least two regions of the mask, wherein an angle between an optical axis of the first type of half wave plate and a side of the mask is $\pi/8$, and an angle between an optical axis of the second type of half wave plate and a side of the mask is $3\pi/8$ or an angle between the optical axis of the first type of half wave plate and the optical axis of the second type of half wave plate is $\pi/4$, wherein a polarization direction of the incident light is located in middle of the optical axis of the first type of half wave plate and the optical axis of the second type of half wave plate.

2. A method of performing photo alignment to a liquid crystal panel, comprising the following steps:
   disposing a mask on one side of a liquid crystal panel, the mask comprising at least two regions, the two regions being structured to convert incident light passing therethrough into first emission a first and a second polarization directions, respectively;

making incident light pass through the at least two regions of the mask to generate the first emission light and the second emission light having the first polarization direction and the second polarization directions such that the first emission light and the second emission light having the first and second polarization directions are applied to perform photo alignment to first and second regions of the liquid crystal panel, the first and second regions being different regions of the liquid crystal panel;

wherein the mask comprises two types of half wave plate to respectively form the at least two regions of the mask, wherein an angle between an optical axis of the first type of half wave plate and a side of the mask is $\pi/8$, and an angle between an optical axis of the second type of half wave plate and a side of the mask is $3\pi/8$ or an angle between the optical axis of the first type of half wave plate and the optical axis of the second type of half wave plate is $\pi/4$, wherein a polarization direction of the incident light is located in middle of the optical axis of the first type of half wave plate and the optical axis of the second type of half wave plate.

3. The method according to claim 2, wherein the first polarization direction and the second polarization direction are perpendicular to each other.

4. The method according to claim 2, wherein the mask at least two wave materials that are arranged side by side with respect to each other and a light absorbing material arranged to separate the at least two wave materials from each other so as to form, respectively, the at least two regions of the mask.

5. A mask to perform a photo alignment process to a liquid crystal panel, wherein the mask comprises at least two regions, the two regions makes incident lights passed and generating emission lights with different polarization directions respectively;

wherein the mask comprises at least two wave materials and a light absorbing material that separates the at least two wave materials from each other; and wherein the mask comprises two types of half wave plate, an angle between an optical axis of the first type of half wave plate and a side of the mask being $\pi/8$, an angle between an optical axis of the second type of half wave plate and a side of the mask being $3\pi/8$ or an angle between the optical axis of the first type of half wave plate and the optical axis of the second type of half wave plate being $\pi/4$, wherein a polarization direction of the incident light is located in middle of the optical axis of the first type of half wave plate and the optical axis of the second type of half wave plates.

6. The mask to perform photo alignment process to a liquid crystal panel according to claim 5, wherein the mask makes the incident light passed and generated the emission lights with the polarization direction perpendicular to each other respectively.

* * * * *